United States Patent
Yoo et al.

(10) Patent No.: US 12,379,001 B2
(45) Date of Patent: Aug. 5, 2025

(54) DRIVE AXLE ASSEMBLY

(71) Applicants: Hyundai Motor Company, Seoul (KR); Kia Corporation, Seoul (KR); HYUNDAI WIA Corporation, Changwon-si (KR)

(72) Inventors: Sung Su Yoo, Suwon-Si (KR); Seok Ho Bae, Seoul (KR); Hee Il Kim, Hwaseong-Si (KR); Chang Hee Jeong, Yongin-Si (KR); Yeong Wook Cho, Uiwang-Si (KR); Bum Jae Lee, Yongin-Si (KR)

(73) Assignees: Hyundai Motor Company, Seoul (KR); Kia Corporation, Seoul (KR); HYUNDAI WIA Corporation, Changwon-si (KR)

(*) Notice: Subject to any disclaimer, the term of this patent is extended or adjusted under 35 U.S.C. 154(b) by 433 days.

(21) Appl. No.: 17/894,706

(22) Filed: Aug. 24, 2022

(65) Prior Publication Data
US 2023/0111825 A1    Apr. 13, 2023

(30) Foreign Application Priority Data
Oct. 12, 2021   (KR) .................. 10-2021-0135074

(51) Int. Cl.
| | |
|---|---|
| B60B 35/12 | (2006.01) |
| B60B 27/00 | (2006.01) |
| F16D 3/223 | (2011.01) |
| F16J 15/54 | (2006.01) |

(52) U.S. Cl.
CPC .......... *F16D 3/223* (2013.01); *B60B 27/0036* (2013.01); *B60B 35/128* (2013.01); *F16J 15/54* (2013.01); *F16D 2003/22323* (2013.01); *Y10S 277/912* (2013.01); *Y10S 464/906* (2013.01)

(58) Field of Classification Search
CPC .......... F16D 3/223; F16D 2003/22323; B60B 27/0036; B60B 35/128; F16J 15/54; Y10S 277/912; Y10S 464/906
USPC ........................................ 464/178; 277/515
See application file for complete search history.

(56) References Cited

U.S. PATENT DOCUMENTS

| | | | | |
|---|---|---|---|---|
| 3,606,352 | A | * | 9/1971 | Lutz ...................... F16J 15/002 277/912 |
| 5,116,293 | A | * | 5/1992 | Reuter .................... F16D 3/223 |
| 7,419,434 | B2 | * | 9/2008 | Wormsbaecher .... B60K 17/344 464/178 |

FOREIGN PATENT DOCUMENTS

| | | |
|---|---|---|
| JP | 2007-315423 | 12/2007 |
| JP | 5868643 | 1/2016 |

\* cited by examiner

*Primary Examiner* — Greg Binda
(74) *Attorney, Agent, or Firm* — Morgan, Lewis & Bockius LLP

(57) ABSTRACT

A drive axle assembly includes a wheel bearing mounted to an axle housing, a shaft assembly including a first shaft on an inboard side thereof to which a driving force of a power train is transmitted, and a second shaft on an outboard side thereof which is shaft-connected to the inside of the axle housing by a constant-velocity joint and is separably assembled to the first shaft, and a boot assembly including a first end portion fixed to an external ring of the wheel bearing and a second end portion assembled to the shaft assembly to be rotatable relative to the shaft assembly, and configured to restrict rotation of the boot and prevent foreign substances from being introduced therein.

22 Claims, 8 Drawing Sheets

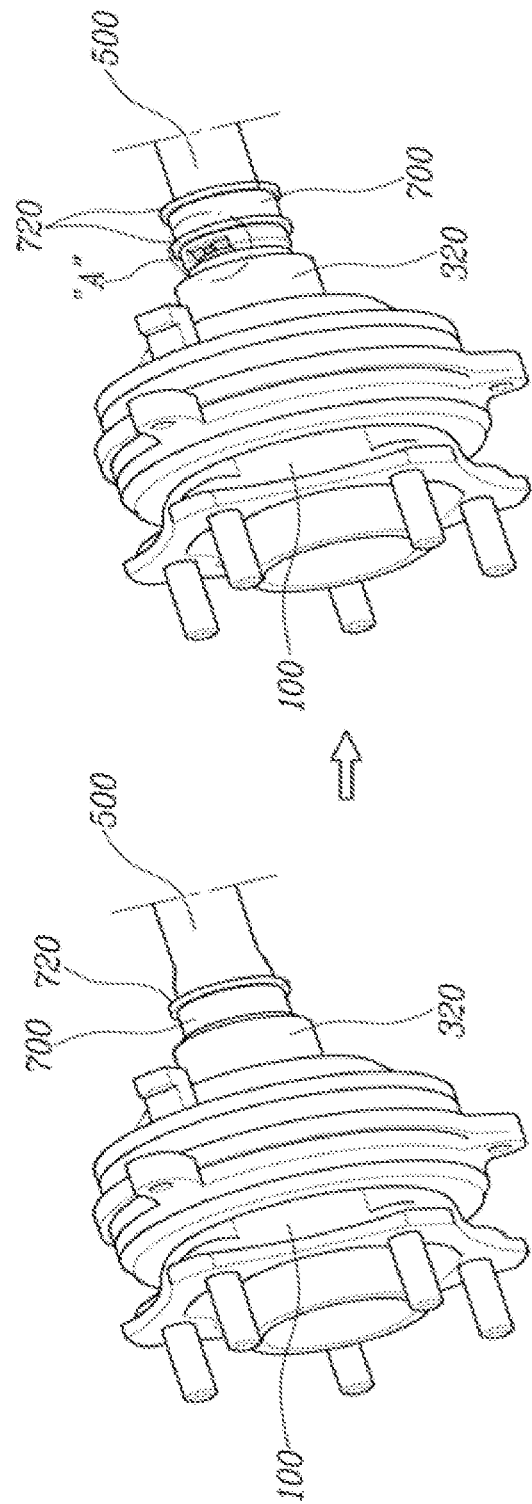

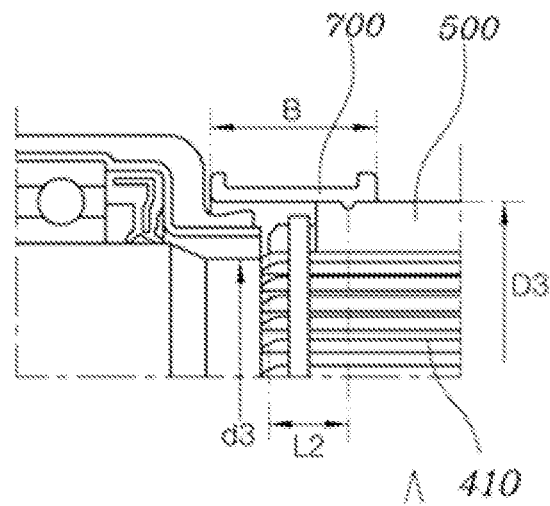
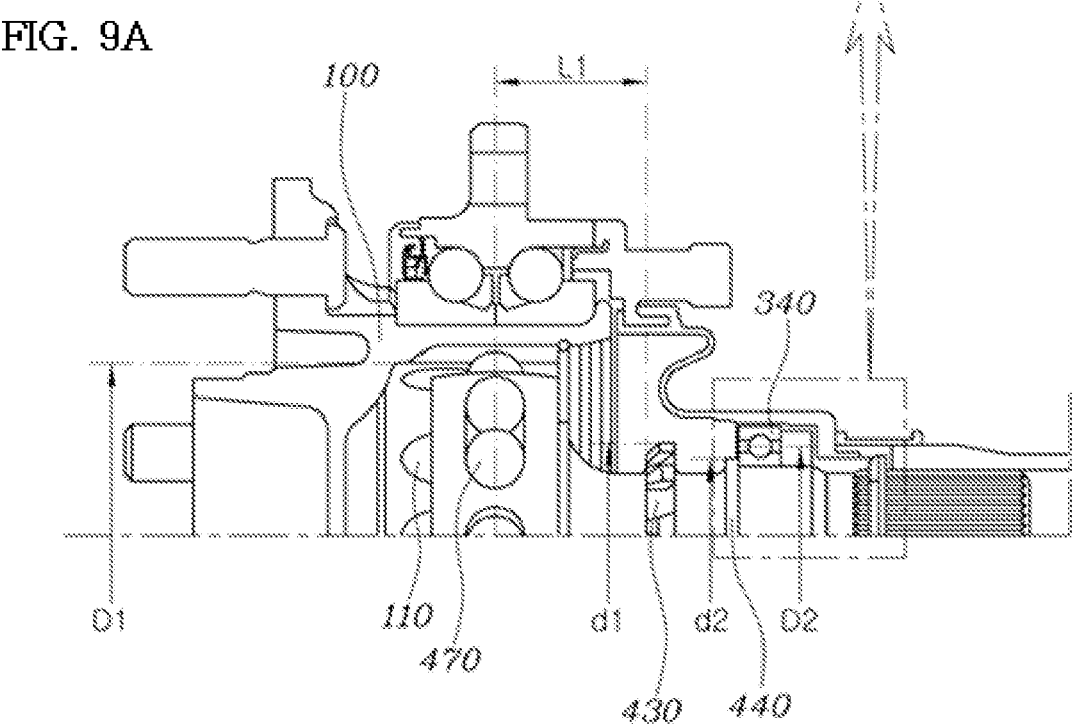

DRIVE AXLE ASSEMBLY

CROSS REFERENCE TO RELATED APPLICATION

The present application claims priority to Korean Patent Application No. 10-2021-0135074, filed Oct. 12, 2021, the entire contents of which is incorporated herein for all purposes by this reference.

BACKGROUND OF THE PRESENT DISCLOSURE

Field of the Present Disclosure

The present disclosure relates to a drive axle assembly that reduces drag torque and improves vehicle fuel efficiency by eliminating the use of a bearing internal seal of a wheel bearing, while reducing friction noise generated from folds of a boot.

Description of Related Art

An integrated drive axle (IDA) has a structure in which an external race of a driveshaft and a hub of a wheel bearing are integrated into a single unit.

In other words, by integrating the functions of the wheel bearing and the driveshaft, many advantages are realized, such as weight reduction and cost reduction of a product. Also, a bending angle of the driveshaft may be increased by reducing a joint-center to joint-center distance, while an increased pitch circle diameter (PCD) of the wheel bearing enables an increase in lateral rigidity of a vehicle.

However, such an increase in size of the wheel bearing acts as a factor to increase drag torque of the wheel bearing, which in turn adversely affects vehicle fuel efficiency.

To reduce the drag torque of the wheel bearing, there may be considered a method of changing the structure of a bearing internal seal responsible for sealability of the wheel bearing.

However, the bearing internal seal sandwiched between an external ring and an internal ring of the wheel bearing is externally exposed of a boot, so that foreign substances may be introduced to the inside of the wheel bearing. To prevent this, the sealability of the bearing internal seal has to be maintained above a predetermined level.

In the instant case, however, the drag torque increases with the increase of the sealability of the bearing internal seal, so there is a limit to reducing the drag torque.

In other words, due to the structure of the bearing internal seal being sandwiched between the internal ring and the external ring, the diameter of the bearing internal seal is formed to be relatively long, and thus the contact area becomes large. As a result, the drag torque increases due to a sealing action of the bearing internal seal.

Furthermore, as the boot rotates in conjunction with a constant-velocity joint, folds of the boot are continuously folded and unfolded along a circumferential direction during full-turn driving. In the present process, soil, snow remover, etc. may stick to or fall from the inside of the folds of the boot when they come into contact with moisture, causing a friction noise.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a drive axle assembly that prevents a boot from being rotated with a driveshaft to thereby reduce drag torque and improve fuel efficiency of a vehicle.

Various aspects of the present disclosure are to provide a drive axle assembly to reduce friction noise generated from folds of a boot.

In an aspect of the present disclosure, there is provided a drive axle assembly including: a wheel bearing mounted to an axle housing; a shaft assembly including a first shaft on an inboard side thereof to which a driving force of a power train is transmitted, and a second shaft on an outboard side thereof which is shaft-connected to inside of the axle housing by a constant-velocity joint and is separably assembled to the first shaft; and a boot assembly including a first end portion fixed to an external ring of the wheel bearing and a second end portion assembled to the shaft assembly to be rotatable relative to the shaft assembly, and configured to restrict rotation of a boot and prevent foreign substances from being introduced therein.

The first shaft and the second shaft may be splined-coupled to each other; a first ring groove and a second ring groove may be circumferentially formed in a spline-coupled portion of the first shaft and the second shaft, respectively; and a stop ring may be simultaneously fitted in the first ring groove and the second ring groove.

The first shaft may be in a form of a hollow shaft and may have spline internal teeth axially formed in an internal peripheral surface of the hollow shaft; the second shaft may be in a form of a solid shaft and may have spline external teeth axially formed in an external peripheral surface thereof; the first ring groove may be circumferentially formed in the internal peripheral surface of the first shaft; and the second ring groove corresponding to the first ring groove may be circumferentially formed in the external peripheral surface of the second shaft.

A boot extension portion may be formed to axially extend from a small-diameter portion of the boot located at the second end portion of the boot assembly toward the first shaft; and a dust cover may be provided to surround a boundary between the first shaft and the second shaft coupled to each other, together with the boot extension portion.

The dust cover may be inserted and assembled into the first shaft to be spaced from the small-diameter portion.

The boot extension portion may be formed in a shape in which an external diameter thereof gradually increases toward an end portion of the boot extension portion.

A cover groove and a cover protrusion including shapes conforming to each other may be respectively formed in an internal peripheral surface of the dust cover and an external peripheral surface of the first shaft, and may be configured to restrict a position of the dust cover.

A work window may be formed in a shape in which a portion of the first shaft into which the stop ring is inserted is circumferentially cut; and the stop ring may be formed in a shape of "C" so that opposite end portions of the stop ring protrude in the work window.

The dust cover may be inserted to cover the work window, and may be configured to be axially moved along the first shaft to open the work window.

A moving rib may be formed to protrude from an external peripheral surface of the dust cover.

An internal race may be integrally formed at an end portion of the second shaft.

A flow fan configured to flow grease inside the axle housing may be provided at an intermediate portion of the second shaft.

The flow fan may be circumferentially integrally formed on the external peripheral surface of the second shaft in a fan shape.

A bearing seal unit may be provided between an internal peripheral surface of the second end portion of the boot assembly and the external peripheral surface of the second shaft; and a stopper may be formed to protrude from the intermediate portion of the second shaft and may be configured to restrict a position of the bearing seal unit.

The bearing seal unit may include: a shaft bearing assembled between the second shaft and the small-diameter portion of the boot located at the second end portion of the boot assembly and configured to allow relative rotation of the second shaft; and a shaft seal assembled between an end portion of the small-diameter portion and the shaft bearing Here, foreign substances introduced between the small-diameter portion and the second shaft are blocked by the shaft seal.

A ratio of a distance from centers of ball grooves formed in the axle housing to a side surface of the flow fan to a pitch circle diameter (PCD) of the ball grooves may satisfy Inequality (1) below.

$$0.35 \leq L1/D1 \leq 0.55 \tag{1}$$

L1: the distance from the centers of the ball grooves to the side surface of the flow fan D1: the PCD of the ball grooves A ratio of an external diameter of the flow fan to a PCD of ball grooves formed in the axle housing may satisfy Inequality (2) below.

$$0.55 \leq d1/D1 \leq 0.85 \tag{2}$$

d1: the external diameter of the flow fan

D1: the PCD of the ball grooves

A ratio of an external diameter of the stopper to a PCD of the shaft bearing may satisfy Inequality (3) below.

$$0.85 \leq d2/D2 \leq 1 \tag{3}$$

d2: the external diameter of the stopper

D2: the PCD of the shaft bearing

A ratio of a maximum external diameter of the first shaft to an external diameter of the spline external teeth formed on the second shaft may satisfy Inequality (4) below.

$$1.25 \leq D3/d3 \leq 1.55 \tag{4}$$

D3: the maximum external diameter of the first shaft d3: the external diameter of the spline external teeth formed on the second shaft A ratio of an axial length of the dust cover to a maximum external diameter of the first shaft may satisfy Inequality (5) below.

$$0.35 \leq B/D3 \leq 0.85 \tag{5}$$

B: the axial length of the dust cover

D3: the maximum external diameter of the first shaft

A ratio of an axial length from an end portion of the first shaft to the cover groove to an axial length of the dust cover may satisfy Inequality (6) below.

$$0.25 \leq L2/B \leq 0.45 \tag{6}$$

L2: the axial length from the end portion of the first shaft to the cover groove B: the axial length of the dust cover According to an exemplary embodiment of the present disclosure configured as described above, the space between the external ring and the internal ring of the wheel bearing is covered by the boot assembly. Thus, it is possible to prevent foreign substances from being introduced to the inside of the wheel bearing and eliminate the use of a conventional bearing internal seal assembled between the external ring and the internal ring. As a result, it is possible to reduce drag torque caused by the bearing internal seal, improving fuel efficiency.

The boot is not rotated even when the shaft assembly is rotated, so that an action in which folds of the boot are continuously folded and unfolded along a circumferential direction does not occur in various driving situations including full-turn driving. Thus, it is possible to prevent friction noise caused by contact and separation of the folds while driving.

Furthermore, the first shaft on the inboard side connected to the transmission and the second shaft on the outboard side connected to the axle housing are configured to be separable, so that the inboard side and the outboard side are assembled as individual assemblies. Thus, it is possible to replace or repair only a malfunctioning assembly, improving maintainability.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5A and FIG. 5B are views exemplarily illustrating a movement operation of a dust cover according to an exemplary embodiment of the present disclosure;

FIG. 9A and FIG. 9B are views exemplarily illustrating the numerical relationship of main parts of the drive axle assembly according to an exemplary embodiment of the present disclosure.

Figure 1:
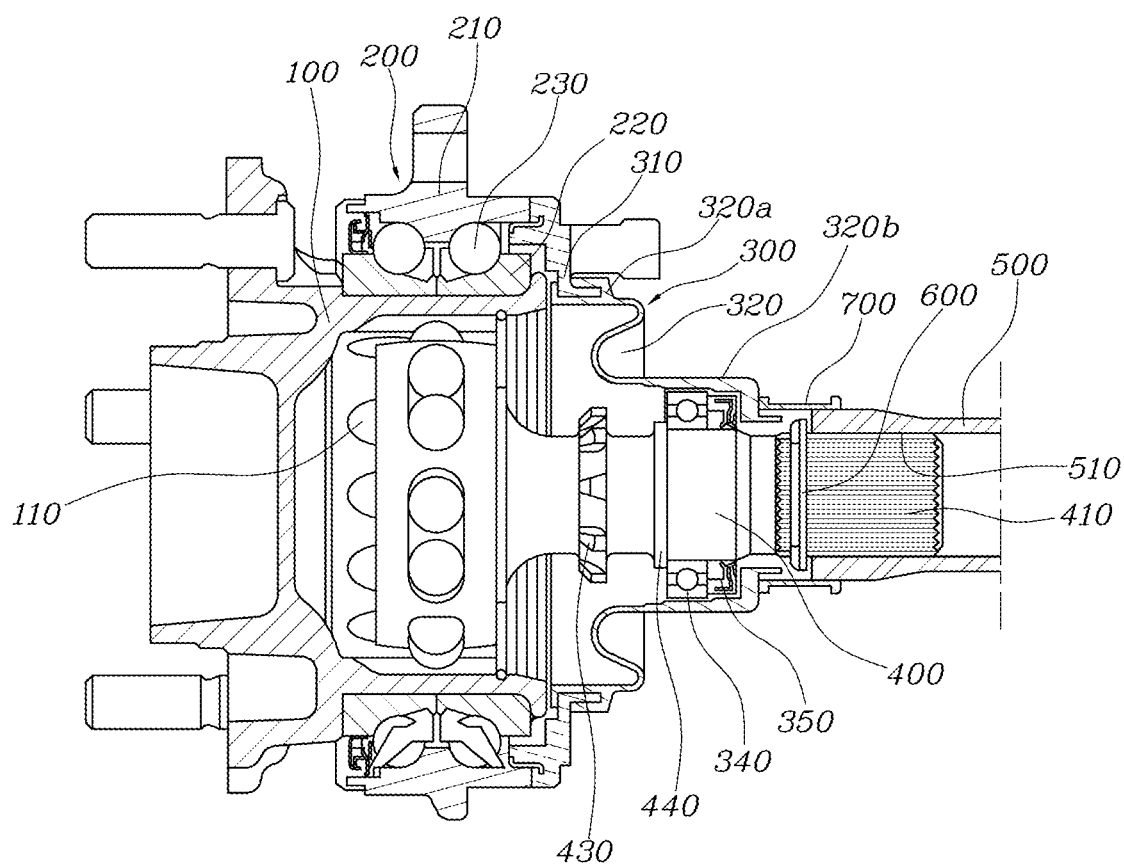
FIG. 1 is a sectional view exemplarily illustrating a drive axle assembly according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. The present disclosure may, however, be embodied in many different forms and should not be construed as being limited to only the embodiments set forth herein, but should be construed as covering modifications, equivalents or alternatives falling within ideas and technical scopes of the present disclosure.

Although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

The terminology used herein is for describing various exemplary embodiments only and is not intended to be limiting. As used herein, the singular forms "a," "an", and "the" are intended to include the plural forms as well, unless the context clearly indicates otherwise. It will be further understood that the terms "comprise", "include", "have", etc. When used in the exemplary embodiment, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which an exemplary embodiment of the present disclosure belongs. It will be further understood that terms used herein should be interpreted as having a meaning which is consistent with their meaning in the context of the present specification and the relevant art and will not be interpreted in an idealized or overly formal sense unless expressly so defined herein.

Hereinbelow, an exemplary various exemplary embodiments of the present disclosure will be described in detail with reference to the accompanying drawings.

Figure 2:
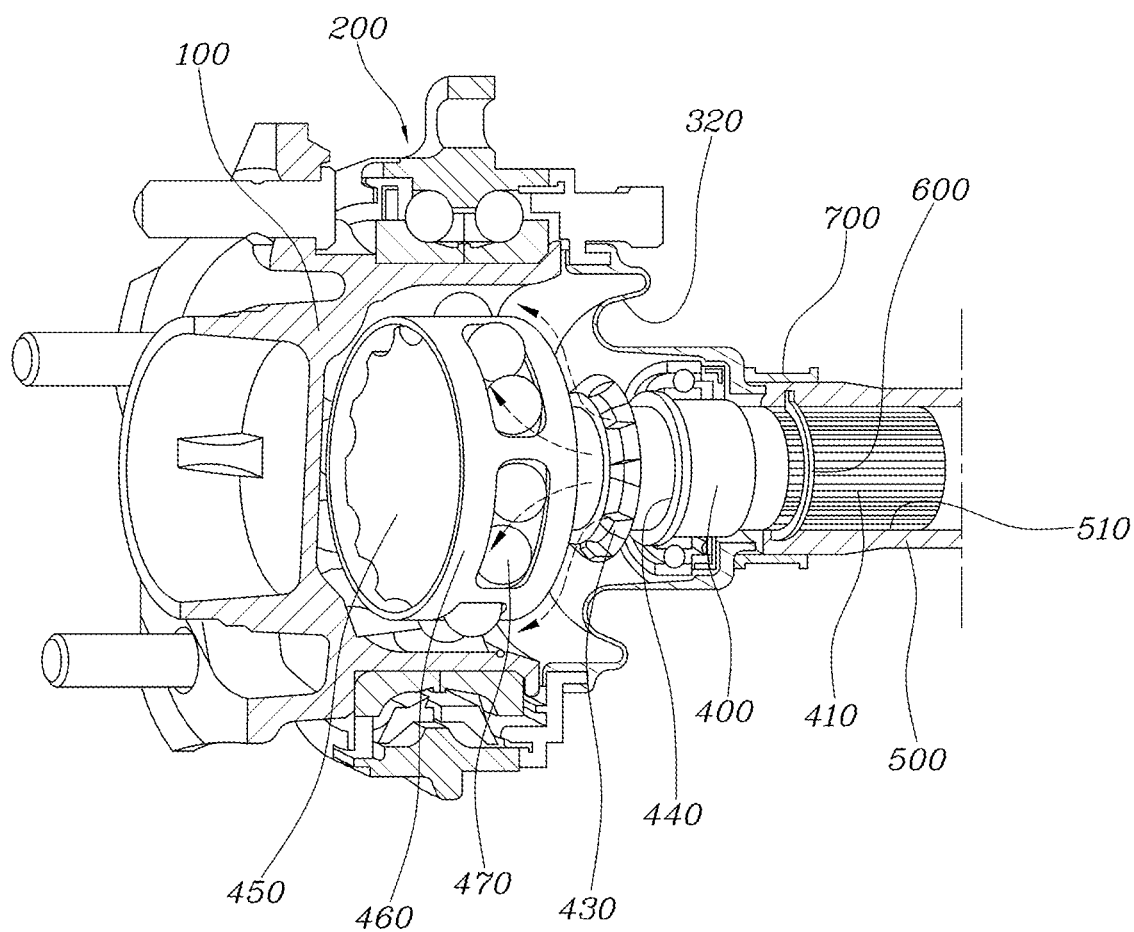
FIG. 2 is a three-dimensional view of FIG. 1.

FIG. 1 is a sectional view exemplarily illustrating a drive axle assembly according to an exemplary embodiment of the present disclosure. FIG. 2 is a three-dimensional view of FIG. 1.

Referring to the drawings, the drive axle assembly according to an exemplary embodiment of the present disclosure is an integrated drive axle (IDA), in which an external ring 210 of a wheel bearing 200 is fixed to a knuckle or a carrier, and a ball 230 (or roller) and a cage are assembled between the external ring 210 and an internal ring 220 of the wheel bearing 200, and the wheel bearing 200 is inserted into an external peripheral surface of an integrated axle housing 100.

An end portion of the axle housing 100 is formed in a shape which is rolled up outwardly by performing an orbital forming processing on the end portion of the axle housing 100, so that the internal ring 220 is fixed to the axle housing 100 by applying a pre-load to the wheel bearing 200.

Furthermore, an end portion of a shaft assembly which will be described later is connected to the inside of the axle housing 100 through a constant-velocity joint, so that a driving force of a power train is transmitted to the constant-velocity joint through the shaft assembly, and the constant-velocity joint is moved and bent according to the behavior of a vehicle, causing the axle housing 100 to be rotated.

Meanwhile, as a characteristic technical configuration of the present disclosure, a boot assembly 300 including a boot 320 is assembled between the external ring 210 of the wheel bearing 200 and the shaft assembly in a state in which rotation thereof is restricted.

Referring to FIG. 1 and FIG. 2, the drive axle assembly includes: the wheel bearing 200 assembled to the axle housing 100; the shaft assembly including a first shaft 500 on an inboard side thereof to which the driving force of the power train is transmitted, and a second shaft 400 on an outboard side thereof which is shaft-connected to the inside of the axle housing 100 by the constant-velocity joint and is separably assembled to the first shaft 500; and the boot assembly 300 including a first end portion fixed to the external ring 210 of the wheel bearing 200 and a second end portion assembled to the shaft assembly to be rotatable relative to the shaft assembly, and restricting rotation of the boot 320 and preventing foreign substances from being introduced therein.

For example, the boot assembly 300 includes the boot 320 and an external ring 310. The external ring 310 is fixed to a large-diameter portion 320a of the boot 320, and the external ring 310 is coupled to the external ring 210 of the wheel bearing 200.

A bearing seal unit which will be described later is assembled between a small-diameter portion 320b of the boot 320 and the shaft assembly to surround the shaft assembly. Thus, the shaft assembly is allowed to be rotated relative to the boot 320, while the boot 320 remains stationary without being rotated.

As described above, a space between the external ring 210 and the internal ring 220 of the wheel bearing 200 is covered by the boot assembly 300. This prevents foreign substances from being introduced to the inside of the wheel bearing 200 and eliminates the use of a conventional bearing internal seal assembled between the external ring 210 and the internal ring 220. Thus, drag torque caused by the bearing internal seal may be reduced, improving fuel efficiency.

The boot 320 is not rotated even when the shaft assembly is rotated, so that an action in which folds of the boot 320 are continuously folded and unfolded along a circumferential direction does not occur in various driving situations including full-turn driving. This prevents friction noise caused by contact and separation of the folds while driving.

Furthermore, the first shaft 500 on the inboard side connected to the transmission and the second shaft 400 on the outboard side connected to the axle housing 100 are configured to be separable, so that the inboard side and the outboard side are assembled as individual assemblies. Thus, only a malfunctioning assembly may be replaced or repaired, improving maintainability.

Figure 3:
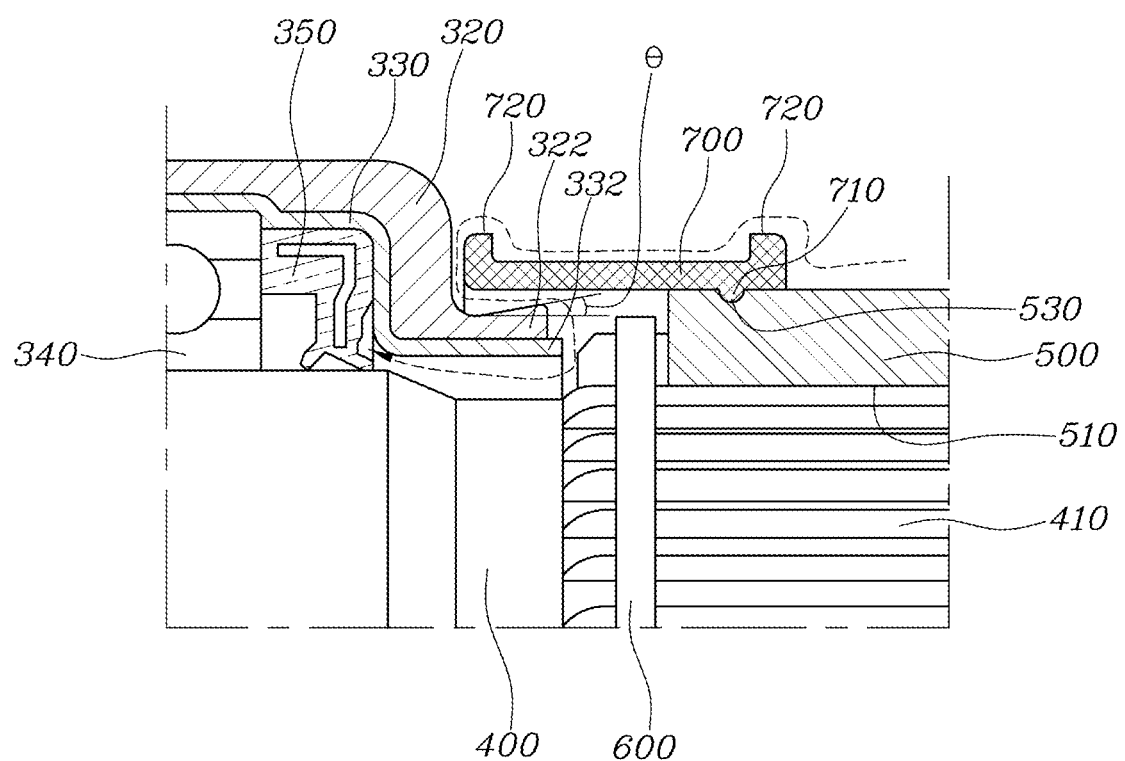
FIG. 3 is an enlarged view exemplarily illustrating a portion in which a first shaft and a second shaft are coupled according to an exemplary embodiment of the present disclosure.
Figure 4B:
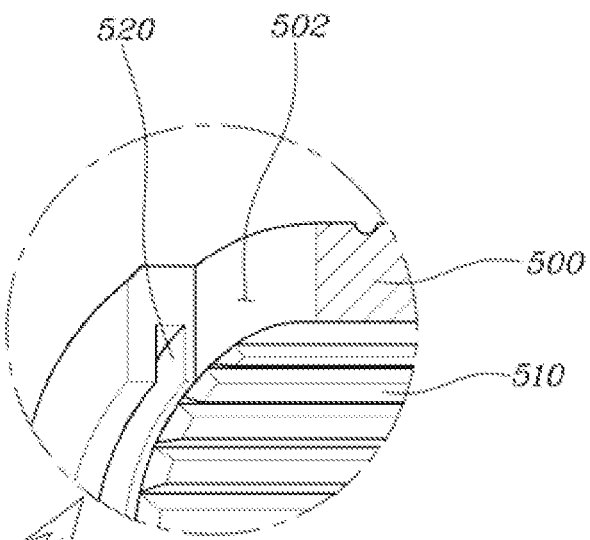
FIG. 4A and FIG. 4B are views exemplarily illustrating a structure in which a stop ring is mounted according to an exemplary embodiment of the present disclosure.
Figure 4A:
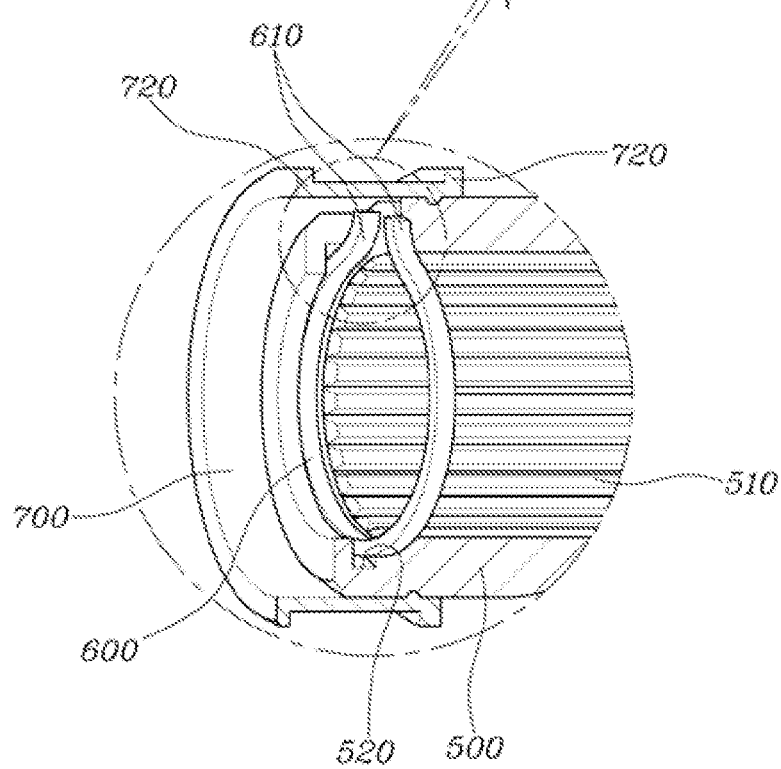

Furthermore, FIG. 3 is an enlarged view exemplarily illustrating a portion in which the first shaft 500 and the second shaft 400 are coupled according to an exemplary embodiment of the present disclosure. FIG. 4A and FIG. 4B are views exemplarily illustrating a structure in which a stop ring 600 is assembled according to an exemplary embodiment of the present disclosure.

Referring to the drawings, the first shaft 500 and the second shaft 400 are spline-coupled to each other; a first ring groove 520 and a second ring groove 420 are circumferentially formed in a spline-coupled portion of the first shaft 500 and the second shaft 400, respectively; and the stop ring 600 is simultaneously fitted in the first ring groove 520 and the second ring groove 420.

In detail, the first shaft 500 is in a form of a hollow shaft and has spline internal teeth 510 axially formed in an internal peripheral surface of the hollow shaft; and the second shaft 400 is in a form of a solid shaft and has spline external teeth 410 axially formed in an external peripheral surface thereof.

Furthermore, the first ring groove 520 is circumferentially formed in the internal peripheral surface of the first shaft 500; and the second ring groove 420 corresponding to the first ring groove 520 is circumferentially formed in the external peripheral surface of the second shaft 400.

In other words, the spline internal teeth 510 are formed on the internal peripheral surface of an end portion of the first shaft 500 facing the second shaft 400, and the spline external teeth 410 including a shape conforming to the spline internal teeth 510 are formed on the external peripheral surface of an end portion of the second shaft 400 facing the first shaft 500, so that the second shaft 400 is inserted into and spline-coupled to the first shaft 500. Thus, the first shaft 500 and the second shaft 400 are rotated together in a state of being constrained relative to each other.

Furthermore, the first ring groove 520 is formed in the internal peripheral surface of the first shaft 500, and the second ring groove 420 is formed in the external peripheral surface of the second shaft 400 corresponding to the first ring groove 520, so that the stop ring 600 is inserted into the first ring groove 520 and the second ring groove 420.

In the inserted state of the stop ring 600, an external radial portion of the stop ring 600 is located in the first ring groove 520, and an internal radial portion of the stop ring 600 is located in the second ring groove 420, so that the first shaft 500 and the second shaft 400 are assembled by the stop ring 600. Thus, the first shaft 500 and the second shaft 400 are moved together in a state of being constrained relative to each other.

Furthermore, referring to FIG. 3, a boot extension portion 322 is formed to axially extend from the small-diameter portion 320b of the boot 300 located at the second end portion of the boot assembly 300 toward the first shaft 500; and a dust cover 700 is provided to surround the boundary between the first shaft 500 and the second shaft 400 coupled to each other, together with the boot extension portion 322.

For example, the dust cover 700 has an annular shape in which a first portion of an internal peripheral surface thereof surrounds the boot extension portion 322 and a second portion of the internal peripheral surface thereof surrounds the external peripheral surface of the first shaft 500 so that an intermediate portion of the internal peripheral surface thereof covers the spline-coupled portion of the first shaft 500 and the second shaft 400.

For reference, a bearing housing 330 is press-fitted and assembled along an internal peripheral surface of the small-diameter portion 320b of the boot 320 to surround a bearing seal unit which will be described later. In the instant case, the bearing housing 330 also has a housing extension portion 332 at an end portion thereof axially extending toward the first shaft 500 to overlap the boot extension portion 322.

In other words, the dust cover 700 is assembled to block the spline-coupled portion of the first shaft 500 and the second shaft 400, preventing foreign substances from being introduced between the first shaft 500 and the second shaft 400.

Furthermore, the dust cover 700 is inserted and assembled into the first shaft 500 so as be spaced from the small-diameter portion 320b.

The dust cover 700 maintains a minute gap with the boot 320 while being rotated with the first shaft 500 so that the rotation of the dust cover 700 is not interfered with.

Thus, the introduction of foreign substances may be prevented by the dust cover 700, and the occurrence of drag torque which may be caused by the dust cover 700 may be prevented.

Furthermore, the boot extension portion 322 is formed in a shape in which an external diameter thereof gradually increases toward an end portion of the boot extension portion. The reference character "θ" as shown in FIG. 3 is an angle at which the end of the boot extension portion 322 is inclined upward in the lateral radial direction with respect to an outer peripheral surface thereof.

For example, when viewed from the cross-sectional structure of the boot extension portion 322, the end portion of the boot extension 322 is formed in a shape inclined radially upwardly.

Thus, even if moisture shown as dashed line and the arrow in FIG. 3 is introduced through the gap between the dust cover 700 and the boot 320, due to the shape of an inclined external peripheral surface of the boot extension portion 322, the moisture is not introduced to a space between the first shaft 500 and the second shaft 400 but is discharged back into a space between the dust cover 700 and the boot 320. This prevents the moisture from being introduced to the inside of the shaft assembly.

Furthermore, a cover groove 530 and a cover protrusion 710 including shapes conforming to each other are respectively formed in the internal peripheral surface of the dust cover 700 and the external peripheral surface of the first shaft 500, and restrict the position of the dust cover 700.

For example, the cover protrusion 710 including a hemispherical cross-sectional shape is circumferentially protrude from the internal peripheral surface of the dust cover 700, and the cover groove 530 including a hemispherical cross-sectional shape conforming to the cover protrusion 710 is circumferentially recessed in the external peripheral surface of the first shaft 500.

In other words, the cover protrusion 710 is fitted into the cover groove 530 at a position where the dust cover 700 covers the spline-coupled portion of the first shaft 500 and the second shaft 400. This ensures that the introduction of foreign substances may be more reliably prevented by the dust cover 700.

Figure 6:
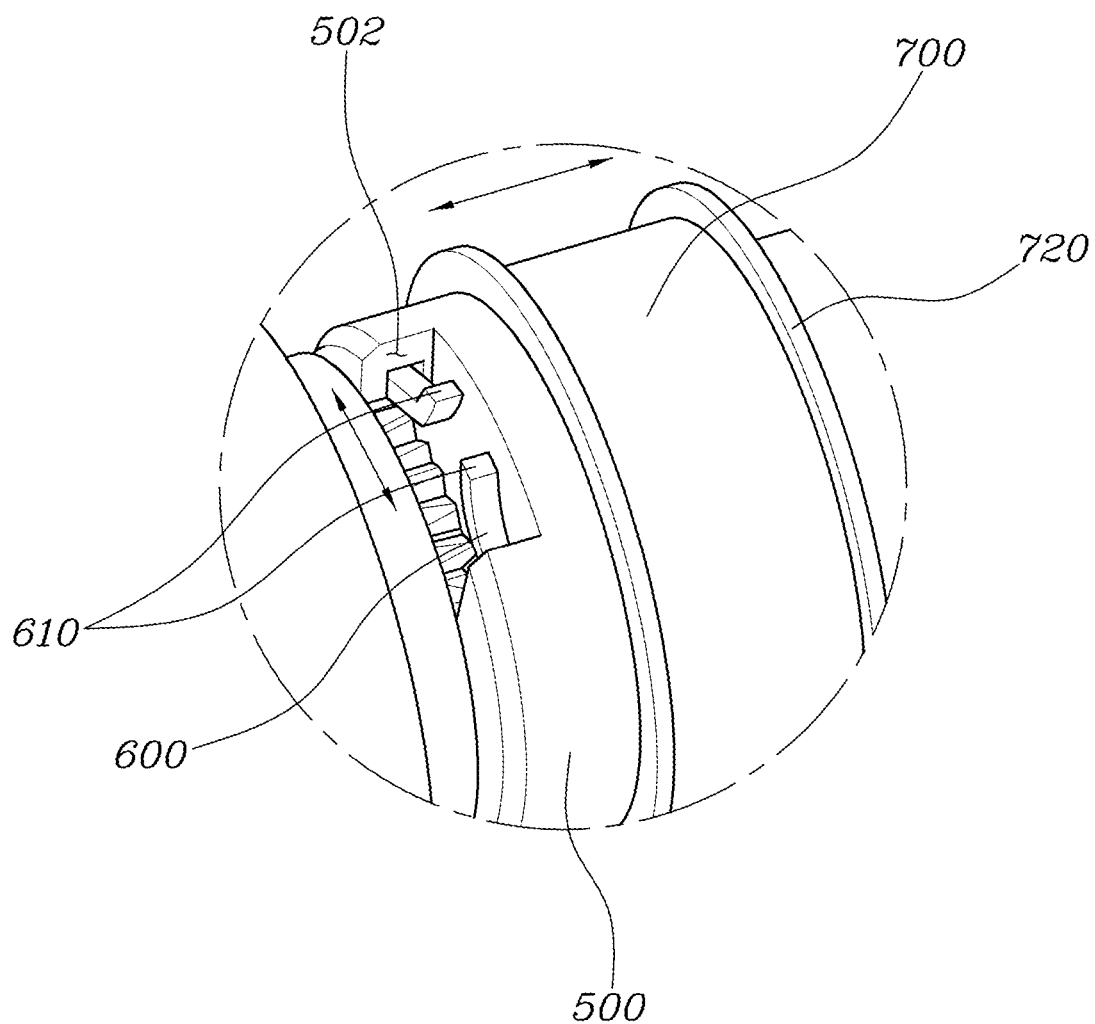
FIG. 6 is a view showing a part "A" of FIG. 5A and FIG. 5B, and illustrating a release operation of the stop ring according to an exemplary embodiment of the present disclosure.

Meanwhile, FIG. 5A and FIG. 5B are views exemplarily illustrating a movement operation of the dust cover 700 according to an exemplary embodiment of the present disclosure. FIG. 6 is a view exemplarily illustrating a release operation of the stop ring 600 according to an exemplary embodiment of the present disclosure.

Referring to the drawings, a work window 502 is formed in a shape in which a portion of the first shaft 500 into which the stop ring 600 is inserted is circumferentially cut; and the stop ring 600 is formed in a shape of "C" so that opposite end portions of the stop ring 600 protrude in the work window 502.

For example, the work window 502 is formed in a shape in which a portion of the first shaft 500 in which the first ring groove 520 is formed is removed. Furthermore, the stop ring 600 may be a "C"-shaped snap ring, and opening and closing portion 610 are formed at the opposite end portions of the stop ring 600 to protrude in the work window 502.

In other words, when the opening and closing portions 610 are opened outwardly by use of a tool such as snap ring pliers, the diameter of the stop ring 600 increases as the stop ring 600 is opened.

Thus, an external peripheral surface of the stop ring 600 is supported on an internal peripheral surface of the first ring groove 520 formed in the first shaft 500, while the internal radial portion of the stop ring 600 is separated away from the second ring groove 420 formed in the second shaft 400, so that the stop ring 600 is released from being engaged with the second shaft 400.

As a result, the first shaft 500 and the second shaft 400 may be separated in directions opposite to the directions in which they are spline-coupled. The present enables easy maintenance of parts and assemblies that require repair and replacement.

Furthermore, the dust cover 700 is inserted to cover the work window 502, and is axially moved along the first shaft 500 to open the work window 502.

In other words, as illustrated in FIG. 5A and FIG. 5B, when the dust cover 700 is located in the outboard direction, the dust cover 700 covers the work window 502 together with the boundary between the first shaft 500 and the second shaft 400 coupled to each other, blocking foreign substances from being introduced through the work window 502.

On the other hand, when the dust cover 700 is located in the inboard direction, the work window 502 is opened to allow a user to perform a separation operation of the first shaft 500 and the second shaft 400 by moving the stop ring 600 exposed through the work window 502.

Furthermore, a moving rib 720 is formed to protrude from an external peripheral surface of the dust cover 700.

For example, the moving rib 720 circumferentially protrudes from each of opposite end portions of the dust cover 700 so that the user can easily perform the movement operation of the dust cover 700 by moving the dust cover 700 in the axial direction of the first shaft 500 while holding the respective moving ribs 720.

Figure 7:
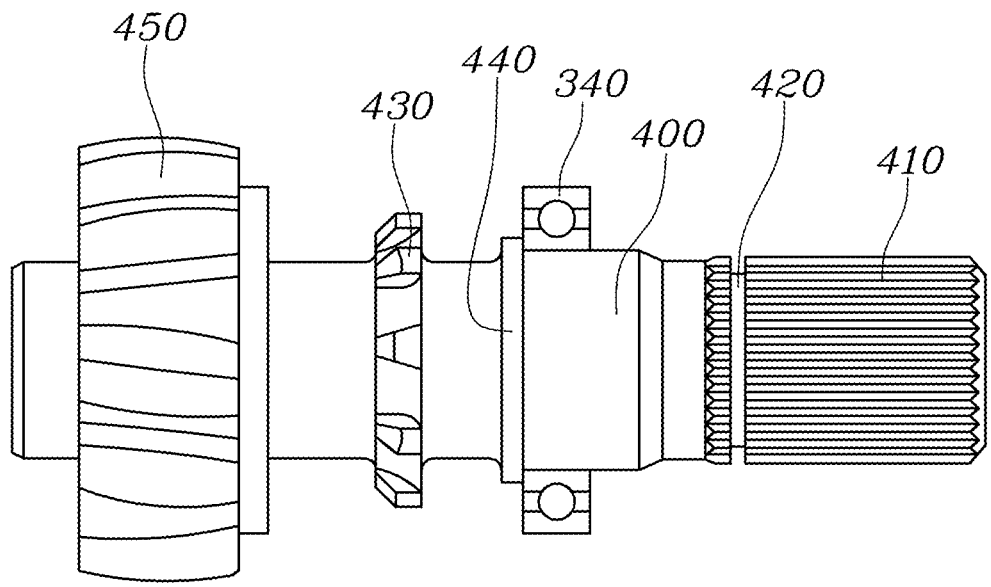
FIG. 7 is a view exemplarily illustrating the structure of various exemplary embodiments in which a second shaft and an internal race are coupled according to an exemplary embodiment of the present disclosure.

Meanwhile, FIG. 7 is a view exemplarily illustrating the structure of various exemplary embodiments in which the second shaft 400 and the internal race 450 are coupled according to an exemplary embodiment of the present disclosure.

Referring to the drawings, the internal race 450 may be inserted and coupled to an end portion of the second shaft 400.

Figure 8:
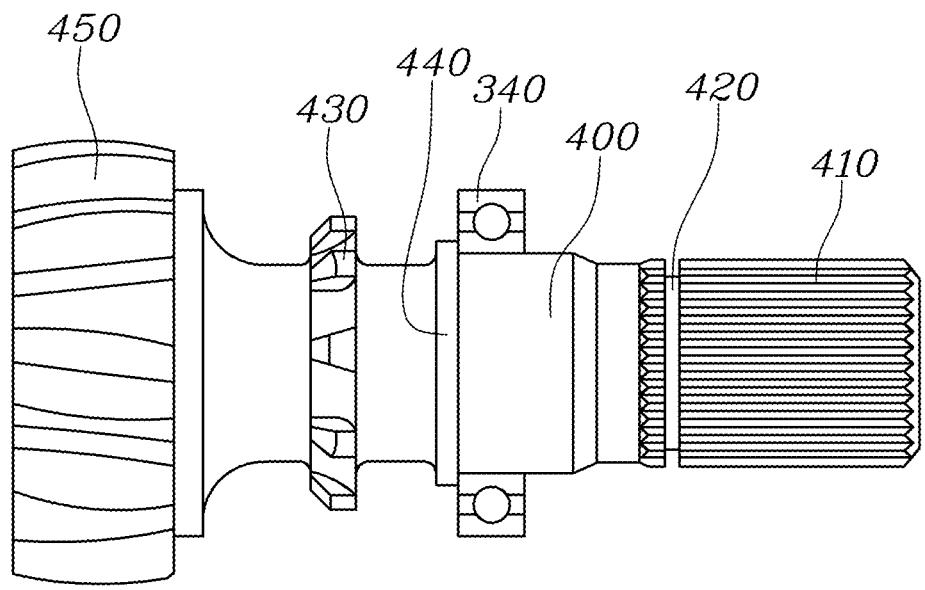
FIG. 8 is a view exemplarily illustrating the structure of various exemplary embodiments in which a second shaft and an internal race are coupled according to an exemplary embodiment of the present disclosure.

FIG. 8 is a view exemplarily illustrating the structure of various exemplary embodiments in which the second shaft 400 and the internal race 450 are coupled according to an exemplary embodiment of the present disclosure.

Referring to the drawings, the internal race 450 may be integrally formed with the second shaft 400.

In other words, the internal race 450 may be separately assembled to the second shaft 400, and alternatively, the internal race 450 may be integrally formed with the second shaft 400 when forming the second shaft 400.

For reference, ball grooves 110 are formed in an internal surface of the axle housing 100, and a cage 470 in which balls 460 for power transmission are fitted is coupled to the internal race 450 to form a constant-velocity joint. Thus, in a state in which the balls 460 for power transmission are inserted into the ball grooves 110, the contact positions of the balls 460 for power transmission are changed according to a refraction angle formed by a driving shaft and a driven shaft, so that the constant-velocity joint is moved at constant velocity while forming a bending angle.

Furthermore, as illustrated in FIGS. 7 and 8, a flow fan 430 for flowing grease inside the axle housing 100 is provided at an intermediate portion of the second shaft 400.

In detail, the flow fan 430 is circumferentially integrally formed on the external peripheral surface of the second shaft 400 in a fan shape.

For example, the flow fan 430 is formed between the internal race 450 and a stopper 440 which will be described later, and is located inside the boot 320.

In other words, the flow fan 430 is rotated in conjunction with the rotation of the shaft assembly. Thus, as illustrated in FIG. 2, as the flow fan 430 is rotated, the grease flows to expand and spread outwardly.

Thus, the grease may be efficiently injected into the ball grooves 110 formed in the internal surface of the axle housing 100 to exhibit improved lubrication performance. This enables smooth bending of the constant-velocity joint and reduces the generation of squeaking, rattling and other undesirable noises.

Furthermore, as illustrated in FIGS. 1 and 3, the bearing seal unit is provided between the internal peripheral surface of the small-diameter portion 320b of the boot 300 located at the second end portion of the boot assembly 300 and the external peripheral surface of the second shaft 400; and the stopper 440 is formed to protrude from the intermediate portion of the second shaft 400 and restricts the position of the bearing seal unit.

For example, a shaft bearing 340 and a shaft seal 350 are sequentially provided along the second shaft 400 to form the bearing seal unit, and the stopper 440 is formed at an end portion of the shaft bearing 340 and restricts an assembly position of the shaft bearing 340.

Thus, the shaft bearing 340 and the shaft seal 350 may be securely and stably assembled between the small-diameter portion 320b of the boot 320 and the second shaft 400.

Furthermore, the bearing seal unit includes: the shaft bearing 340 assembled between the second shaft 400 and the small-diameter portion 320b of the boot 320 located at the second end portion of the boot assembly 300 and allowing relative rotation of the second shaft 400; and the shaft seal 350 assembled between an end portion of the small-diameter portion 320b and the shaft bearing 340. Foreign substances introduced between the small-diameter portion 320b and the second shaft 400 may be blocked by the shaft seal 350.

For example, the shaft bearing 340 may be a bearing such as a ball bearing or a needle bearing, and has a structure in which an internal ring of the shaft bearing 340 is supported on the second shaft 400 while an external ring of the shaft bearing 340 is supported on the small-diameter portion 320b of the boot 320.

Furthermore, the shaft seal 350 is provided inside the end portion of the small-diameter portion 320b of the boot 320 to surround the second shaft 400.

Thus, even if foreign substances are introduced between the boot extension portion 322 and the second shaft 400 through the boundary between the first shaft 500 and the second shaft 400, the foreign substances may be blocked from being introduced to the inside of the boot 320 by the shaft seal 350.

Furthermore, because the second shaft 400 is in a form of a solid shaft, the external diameter of the second shaft 400 is less than the internal diameter of the first shaft 500 in a form of a hollow shaft. Accordingly, the external diameter of the shaft bearing 340 supported on the second shaft 400 is reduced, so that a bending range of the constant-velocity joint may be extended.

For reference, although drag torque may be affected by the shaft seal 350, due to the characteristics of the position and size of the shaft seal 350, the shaft seal 350 has a relatively short diameter compared to the bearing internal seal mounted on the wheel bearing 200. Thus, the degree of increase in the drag torque is not large compared to the bearing internal seal, contributing to improving fuel efficiency of the vehicle.

Meanwhile, FIG. 9A and FIG. 9B are views exemplarily illustrating the numerical relationship of main parts of the drive axle assembly according to an exemplary embodiment of the present disclosure.

Referring to the drawings, the ratio of the distance from the centers of the ball grooves 110 formed in the axle housing 100 to a side surface of the flow fan 430 to the pitch circle diameter (PCD) of the ball grooves 110 may satisfy Inequality (1) below.

$$0.35 \leq L1/D1 \leq 0.55 \tag{1}$$

L1: the distance from the centers of the ball grooves to the side surface of the flow fan 430
D1: the PCD of the ball grooves 110

According to such a numerical range, the positions of the flow fan 430 and the ball grooves 110 are determined in consideration of the flow radius of the grease by the flow fan 430. This improves the lubrication performance of the grease.

Furthermore, the ratio of the external diameter of the flow fan 430 to the PCD of the ball grooves 110 formed in the axle housing 100 may satisfy Inequality (2) below.

$$0.55 \leq d1/D1 \leq 0.85 \tag{2}$$

d1: the external diameter of the flow fan 430
D1: the PCD of the ball grooves 110

According to such a numerical range, the diameter of the flow fan 430 and the positions of the ball grooves 110 are determined in consideration of the flow radius of the grease by the flow fan 430. This improves the lubrication performance of the grease.

Furthermore, the ratio of the external diameter of the stopper 440 to the PCD of the shaft bearing 340 may satisfy Inequality (3) below.

$$0.85 \leq d2/D2 \leq 1 \tag{3}$$

d2: the external diameter of the stopper 440
D2: the PCD of the shaft bearing 340

According to such a numerical range, the stopper 440 is not formed in a shape that at least blocks rolling elements of the shaft bearing 340, so that the stopper 440 does not block the grease contained in the boot 320 from being introduced into the shaft bearing 340. This improves the lubrication performance of the grease for the shaft bearing 340.

Furthermore, the ratio of the maximum external diameter of the first shaft 500 to the external diameter of the spline external teeth 410 formed on the second shaft 400 may satisfy Inequality (4) below.

$$1.25 \leq D3/d3 \leq 1.55 \tag{4}$$

D3: the maximum external diameter of the first shaft 500
d3: the external diameter of the spline external teeth 410 formed on the second shaft 400

According to such a numerical range, the thickness of the first shaft 500 in a form of a hollow shaft is formed within a predetermined range at the spline-coupled portion of the first shaft 500 and the second shaft 400. This prevents the thickness of the first shaft 500 from being excessively increased, while improving the strength of the first shaft 500, reducing cost and weight.

Furthermore, the ratio of the axial length of the dust cover 700 to the maximum external diameter of the first shaft 500 may satisfy Inequality (5) below.

$$0.35 \leq B/D3 \leq 0.85 \tag{5}$$

B: the axial length of the dust cover 700
D3: the maximum external diameter of the first shaft 500

According to such a numerical range, the axial length of the dust cover 700 is not excessively large compared to the external diameter of the first shaft 500 and thus can cover the boundary between the first shaft 500 and the second shaft 400. This enables, when the movement of the dust cover 700, such as the separation operation of the first shaft 500 and the second shaft 400, is needed, maintenance work without excessively moving the dust cover 700.

Furthermore, the ratio of the axial length from an end portion of the first shaft 500 to the cover groove 530 to the axial length of the dust cover 700 may satisfy Inequality (6) below.

$$0.25 \leq L2/B \leq 0.45 \tag{6}$$

L2: the axial length from the end portion of the first shaft 500 to the cover groove 530
B: the axial length of the dust cover 700

According to such a numerical range, the axial length of the dust cover 700 is formed so that the dust cover 700 is assembled to the first shaft 500 while stably covering the boundary between the first shaft 500 and the second shaft 400. This improves the assembly stability of the dust cover 700.

As described above, the space between the external ring 210 and the internal ring 220 of the wheel bearing 200 is covered by the boot assembly 300. This prevents foreign substances from being introduced to the inside of the wheel bearing 200 and eliminates the use of a conventional bearing internal seal assembled between the external ring 210 and the internal ring 220. Thus, drag torque caused by the bearing internal seal may be reduced, improving fuel efficiency.

The boot 320 is not rotated even when the shaft assembly is rotated, so that an action in which folds of the boot 320 are continuously folded and deployed along a circumferential direction does not occur in various driving situations including full-turn driving. This prevents friction noise caused by contact and separation of the folds while driving.

Furthermore, the first shaft 500 on the inboard side connected to the transmission and the second shaft 400 on the outboard side connected to the axle housing 100 are configured to be separable, so that the inboard side and the outboard side are assembled as individual assemblies. Thus, only a malfunctioning assembly may be replaced or repaired, improving maintainability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A drive axle assembly comprising:
    a wheel bearing mounted to an axle housing;
    a shaft assembly including a first shaft on an inboard side thereof to which a driving force of a power train is transmitted, and a second shaft on an outboard side thereof which is shaft-connected to inside of the axle housing by a constant-velocity joint and is separably assembled to the first shaft; and
    a boot assembly including a first end portion fixed to an external ring of the wheel bearing and a second end portion assembled to the shaft assembly to be rotatable relative to the shaft assembly, and configured to restrict rotation of a boot and prevent foreign substances from being introduced therein,
    wherein a flow fan configured to flow grease inside the axle housing is provided at an intermediate portion of the second shaft.

2. The drive axle assembly of claim 1,
    wherein the first shaft and the second shaft are splined-coupled to each other,
    wherein a first ring groove and a second ring groove are circumferentially formed in a spline-coupled portion of the first shaft and the second shaft, respectively, and
    wherein a stop ring is fitted in the first ring groove and the second ring groove.

3. The drive axle assembly of claim 2,
    wherein the first shaft is a hollow shaft and has spline internal teeth axially formed in an internal peripheral surface of the hollow shaft,
    wherein the second shaft is a solid shaft and has spline external teeth axially formed in an external peripheral surface of the solid shaft,
    wherein the first ring groove is circumferentially formed in the internal peripheral surface of the first shaft, and
    wherein the second ring groove corresponding to the first ring groove is circumferentially formed in the external peripheral surface of the second shaft.

4. The drive axle assembly of claim 3, wherein a ratio of a maximum external diameter of the first shaft to an external diameter of the spline external teeth formed on the second shaft satisfies Inequality (4) below:

$$1.25 \leq D3/d3 \leq 1.55 \tag{4}$$

D3: the maximum external diameter of the first shaft
d3: the external diameter of the spline external teeth formed on the second shaft.

5. The drive axle assembly of claim 2,
    wherein a boot extension portion is formed to axially extend from a small-diameter portion of the boot located at the second end portion of the boot assembly toward the first shaft, and
    wherein a dust cover is provided to surround a boundary between the first shaft and the second shaft coupled to each other, together with the boot extension portion.

6. The drive axle assembly of claim 5, wherein the dust cover is inserted and assembled into the first shaft to be spaced from the small-diameter portion.

7. The drive axle assembly of claim 5, wherein an external diameter of the boot extension portion increases toward an end portion of the boot extension portion.

8. The drive axle assembly of claim 5, wherein a cover groove and a cover protrusion having shapes conforming to each other are respectively formed in an internal peripheral surface of the dust cover and an external peripheral surface of the first shaft, and are configured to restrict a position of the dust cover.

9. The drive axle assembly of claim 8, wherein a ratio of an axial length from an end portion of the first shaft to the cover groove to an axial length of the dust cover satisfies Inequality (6) below:

$$0.25 \leq L2/B \leq 0.45 \tag{6}$$

L2: the axial length from the end portion of the first shaft to the cover groove
B: the axial length of the dust cover.

10. The drive axle assembly of claim 5,
    wherein a work window is formed in a shape in which a portion of the first shaft into which the stop ring is inserted is circumferentially cut, and wherein the stop ring is formed in a shape of "C" so that opposite end portions of the stop ring protrude in the work window.

11. The drive axle assembly of claim 10, wherein the dust cover is inserted to cover the work window, and is configured to be axially moved along the first shaft to open the work window.

12. The drive axle assembly of claim 11, wherein a moving rib is formed to protrude from an external peripheral surface of the dust cover.

13. The drive axle assembly of claim 5, wherein a ratio of an axial length of the dust cover to a maximum external diameter of the first shaft satisfies Inequality (5) below:

$$0.35 \leq B/D3 \leq 0.85 \quad (5)$$

B: the axial length of the dust cover
D3: the maximum external diameter of the first shaft.

14. The drive axle assembly of claim 1,
wherein the flow fan is integrally formed at an intermediate portion of the second shaft, and
wherein an internal race is integrally formed at an end portion of the second shaft.

15. The drive axle assembly of claim 1,
wherein a bearing seal unit is provided between an internal peripheral surface of the second end portion of the boot assembly and an external peripheral surface of the second shaft, and
wherein a stopper is formed to protrude from an intermediate portion of the second shaft and is configured to restrict a position of the bearing seal unit.

16. The drive axle assembly of claim 15, wherein the bearing seal unit includes:
a shaft bearing assembled between the second shaft and a small-diameter portion of the boot located at the second end portion of the boot assembly and configured to allow relative rotation of the second shaft; and
a shaft seal assembled between an end portion of the small-diameter portion and the shaft bearing,
wherein the foreign substances introduced between the small-diameter portion and the second shaft are blocked by the shaft seal.

17. The drive axle assembly of claim 16, wherein a ratio of an external diameter of the stopper to a PCD of the shaft bearing satisfies Inequality (3) below:

$$0.85 \leq d2/D2 \leq 1 \quad (3)$$

d2: the external diameter of the stopper
D2: the PCD of the shaft bearing.

18. The drive axle assembly of claim 1, wherein a ratio of a distance from centers of ball grooves formed in the axle housing to a side surface of the flow fan to a pitch circle diameter (PCD) of the ball grooves satisfies Inequality (1) below:

$$0.35 \leq L1/D1 \leq 0.55 \quad (1)$$

L1: the distance from the centers of the ball grooves to the side surface of the flow fan
D1: the PCD of the ball grooves.

19. The drive axle assembly of claim 1, wherein a ratio of an external diameter of the flow fan to a PCD of ball grooves formed in the axle housing satisfies Inequality (2) below:

$$0.55 \leq d1/D1 \leq 0.85 \quad (2)$$

d1: the external diameter of the flow fan
D1: the PCD of the ball grooves.

20. A drive axle assembly comprising:
a wheel bearing mounted to an axle housing;
a shaft assembly including a first shaft on an inboard side thereof to which a driving force of a power train is transmitted, and a second shaft on an outboard side thereof which is shaft-connected to inside of the axle housing by a constant-velocity joint and is separably assembled to the first shaft; and
a boot assembly including a first end portion fixed to an external ring of the wheel bearing and a second end portion assembled to the shaft assembly to be rotatable relative to the shaft assembly, and configured to restrict rotation of a boot and prevent foreign substances from being introduced therein,
wherein the first shaft and the second shaft are splined-coupled to each other,
wherein a first ring groove and a second ring groove are circumferentially formed in a spline-coupled portion of the first shaft and the second shaft, respectively,
wherein a stop ring is fitted in the first ring groove and the second ring groove,
wherein a boot extension portion is formed to axially extend from a small-diameter portion of the boot located at the second end portion of the boot assembly toward the first shaft,
wherein a dust cover is provided to surround a boundary between the first shaft and the second shaft coupled to each other, together with the boot extension portion, and wherein the dust cover is inserted and assembled into the first shaft to be spaced from the small-diameter portion.

21. A drive axle assembly comprising:
a wheel bearing mounted to an axle housing;
a shaft assembly including a first shaft on an inboard side thereof to which a driving force of a power train is transmitted, and a second shaft on an outboard side thereof which is shaft-connected to inside of the axle housing by a constant-velocity joint and is separably assembled to the first shaft; and
a boot assembly including a first end portion fixed to an external ring of the wheel bearing and a second end portion assembled to the shaft assembly to be rotatable relative to the shaft assembly, and configured to restrict rotation of a boot and prevent foreign substances from being introduced therein,
wherein the first shaft and the second shaft are splined-coupled to each other,
wherein a first ring groove and a second ring groove are circumferentially formed in a spline-coupled portion of the first shaft and the second shaft, respectively,
wherein a stop ring is fitted in the first ring groove and the second ring groove,
wherein a boot extension portion is formed to axially extend from a small-diameter portion of the boot located at the second end portion of the boot assembly toward the first shaft,
wherein a dust cover is provided to surround a boundary between the first shaft and the second shaft coupled to each other, together with the boot extension portion, and wherein an external diameter of the boot extension portion increases toward an end portion of the boot extension portion.

22. A drive axle assembly comprising:
a wheel bearing mounted to an axle housing;
a shaft assembly including a first shaft on an inboard side thereof to which a driving force of a power train is transmitted, and a second shaft on an outboard side thereof which is shaft-connected to inside of the axle housing by a constant-velocity joint and is separably assembled to the first shaft; and a boot assembly including a first end portion fixed to an external ring of the wheel bearing and a second end portion assembled to the shaft assembly to be rotatable relative to the shaft assembly, and configured to restrict rotation of a boot and prevent foreign substances from being introduced therein, wherein the first shaft and the second shaft are splined-coupled to each other, wherein a first ring groove and a second ring groove are circumferentially formed in a spline-coupled portion of the first shaft and the second shaft, respectively, wherein a stop ring is fitted in the first ring groove and the second ring groove, wherein a boot extension portion is formed to axially extend from a small-diameter portion of the boot located at the second end portion of the boot assembly toward the first shaft, wherein a dust cover is provided to surround a boundary between the first shaft and the second shaft coupled to each other, together with the boot extension portion, wherein a work window is formed in a shape in which a portion of the first shaft into which the stop ring is inserted is circumferentially cut, and wherein the stop ring is formed in a shape of "C" so that opposite end portions of the stop ring protrude in the work window.

* * * * *